US010909410B2

(12) United States Patent
Geigel (10) Patent No.: US 10,909,410 B2
(45) Date of Patent: Feb. 2, 2021

(54) MAPPING AN IMAGE ASSOCIATED WITH A NARRATIVE TO A CONCEPTUAL DOMAIN

(71) Applicant: Arturo Geigel, Bayamon, PR (US)

(72) Inventor: Arturo Geigel, Bayamon, PR (US)

( * ) Notice: Subject to any disclaimer, the term of this patent is extended or adjusted under 35 U.S.C. 154(b) by 228 days.

(21) Appl. No.: 15/984,110

(22) Filed: May 18, 2018

(65) Prior Publication Data

US 2018/0268249 A1 Sep. 20, 2018

Related U.S. Application Data

(63) Continuation of application No. 14/665,883, filed on Mar. 23, 2015, now abandoned.

(60) Provisional application No. 61/968,870, filed on Mar. 21, 2014.

(51) Int. Cl.
| | | |
|---|---|---|
| *G06K 9/50* | (2006.01) | |
| *G06K 9/00* | (2006.01) | |
| *G06K 9/62* | (2006.01) | |
| *G06K 9/42* | (2006.01) | |
| *G06F 16/51* | (2019.01) | |
| *G06F 16/583* | (2019.01) | |
| *G06K 9/32* | (2006.01) | |
| *G06Q 50/18* | (2012.01) | |

(52) U.S. Cl.
CPC .............. *G06K 9/50* (2013.01); *G06F 16/51* (2019.01); *G06F 16/5854* (2019.01); *G06K 9/00456* (2013.01); *G06K 9/3233* (2013.01); *G06K 9/42* (2013.01); *G06K 9/6282* (2013.01); *G06Q 50/184* (2013.01)

(58) Field of Classification Search
CPC . G06F 16/51; G06F 16/5854; G06K 9/00456; G06K 9/3233; G06K 9/42; G06K 9/50; G06K 9/6212; G06K 9/6282; G06Q 50/184
See application file for complete search history.

(56) References Cited

U.S. PATENT DOCUMENTS

| | | | |
|---|---|---|---|
| 5,764,814 A | 6/1998 | Chen | |
| 5,940,538 A | 8/1999 | Spiegel | |
| 5,991,780 A | 11/1999 | Rivette | |
| 6,330,003 B1* | 12/2001 | Curtis | G06T 11/60 345/648 |
| 7,738,730 B2* | 6/2010 | Hawley | G06K 9/4633 382/278 |
| 8,065,302 B2 | 11/2011 | Sridhar | |
| 8,103,692 B2 | 1/2012 | Kim | |
| 8,489,583 B2 | 7/2013 | Phillips | |
| 9,092,545 B2* | 7/2015 | Rivette | G06F 40/117 |

(Continued)

OTHER PUBLICATIONS

Vrochidis, Stefanos, et al., "Towards Content-based Patent Image Retrieval: A Framework Perspective", World Patent Information 32 (2010), pp. 94-106. (Year: 2010).*

*Primary Examiner* — Scott A. Waldron
(74) *Attorney, Agent, or Firm* — Eugenio J. Torres-Oyola; Victor M. Rodriguez-Reyes; Ferraiuoli LLC (57) ABSTRACT

A system that compares the images submitted with a pre-processed database containing pictures, drawings, and patent drawings, among other media. The images are interrelated by comparing the content of the patent images, the narrative in the patents with the other visual media which may or may not be pre-tagged.

10 Claims, 10 Drawing Sheets

(56) References Cited

U.S. PATENT DOCUMENTS

2012/0075333 A1\* 3/2012 Chen .................... G06F 3/1462
345/619

\* cited by examiner

| | | | | | | |
|---|---|---|---|---|---|---|
| (-3,3) | (-2,3) | (-2,3) | (0,3) | (1,3) | (2,3) | (3,3) |
| (-3,2) | (-2,2) | (-2,2) | (0,2) | (1,2) | (2,2) | (3,2) |
| (-3,1) | (-2,1) | (-1,1) | (0,1) | (1,1) | (2,1) | (3,1) |
| (-3,0) | (-2,0) | (-1,0) | (0,0) | (1,0) | (2,0) | (3,0) |
| (-3,-1) | (-2,-1) | (-1,-1) | (0,-1) | (1,-1) | (2,-1) | (3,-1) |
| (-3,-2) | (-2,-2) | (-2,-2) | (0,-2) | (1,-2) | (2,-2) | (3,-2) |
| (-3,-3) | (-2,-3) | (-2,-3) | (0,-3) | (1,-3) | (2,-3) | (3,-3) |

MAPPING AN IMAGE ASSOCIATED WITH A NARRATIVE TO A CONCEPTUAL DOMAIN

RELATED APPLICATIONS

This application is a Continuation-In-Part of U.S. patent application Ser. No. 14/665,883, filed on Mar. 23, 2015, the contents of which are fully incorporated by reference, which in turn claims priority from U.S. Provisional Application 61/968,870, filed on Mar. 21, 2014, the contents of which are fully incorporated by reference.

FIELD OF THE INVENTION

The invention relates to the field of image processing and semantic networks specifically the method of relating visual information with additional information to functional as well as structural graph to narrow the scope of the image segment that relates to a specific narrative within a patent narrative. The invention further relates to methods for searching structural as well as functional relations in graphs stored in databases or memory using a pictures through a user interface.

BACKGROUND OF THE INVENTION

The present invention relates to the field of analytics, in particular with associating an image with structural and functional components that are described by means of a narrative such as the one in a patent submission. Further such structural and functional narratives of patents do not necessarily include all necessary elements.

DESCRIPTION OF PRIOR ART

The prior art can be roughly divided into four major categories. The first pertains to the image processing necessary to carry out a query by example image retrieval. Patents such as U.S. Pat. Nos. 5,764,814 and 5,940,538 fall into this category.

The second category pertains to annotations made on images, videos and multimedia repositories that will enable efficient indexing and searching of the stored content. Patents in this category are exemplified by U.S. Pat. No. 8,065,302 B2.

The third category pertains to search systems using images in a query by example search for the retrieval of relevant information including documents, and other related images. Representative patents in this category are U.S. Pat. No. 8,103,692 B2 and U.S. Pat. No. 8,489,583 B2.

The final category pertains to the application of such techniques to the restricted domain of semi-structured document domain such as patents. The domain specifically focuses on displaying patent text and images that are the result of a query by example or keyword search. Representative patent in this domain is patent U.S. Pat. No. 5,991,780 A.

SHORTCOMINGS OF PRIOR ART

The prior art fails to exploit the advantages of having tagged information to refine the referenced area within an image in an efficient manner. While there exist annotation schemes such as U.S. Pat. No. 8,065,302 B2 these schemes are not directly connected to the image region and its narrative. In addition the previous art does not normalize the information based on this information to provide a better query by example image search. The challenges that are not addressed in the previous art with regards to normalization of images using textual information is the determination of common word graph elements that may be important to image based query by example. To provide such information, common elements found in the word graph and in the image must be taken into account together to provide the necessary information to limit the reference area of importance.

DETAILED DESCRIPTION OF THE PREFERRED EMBODIMENTS

Figure 1:
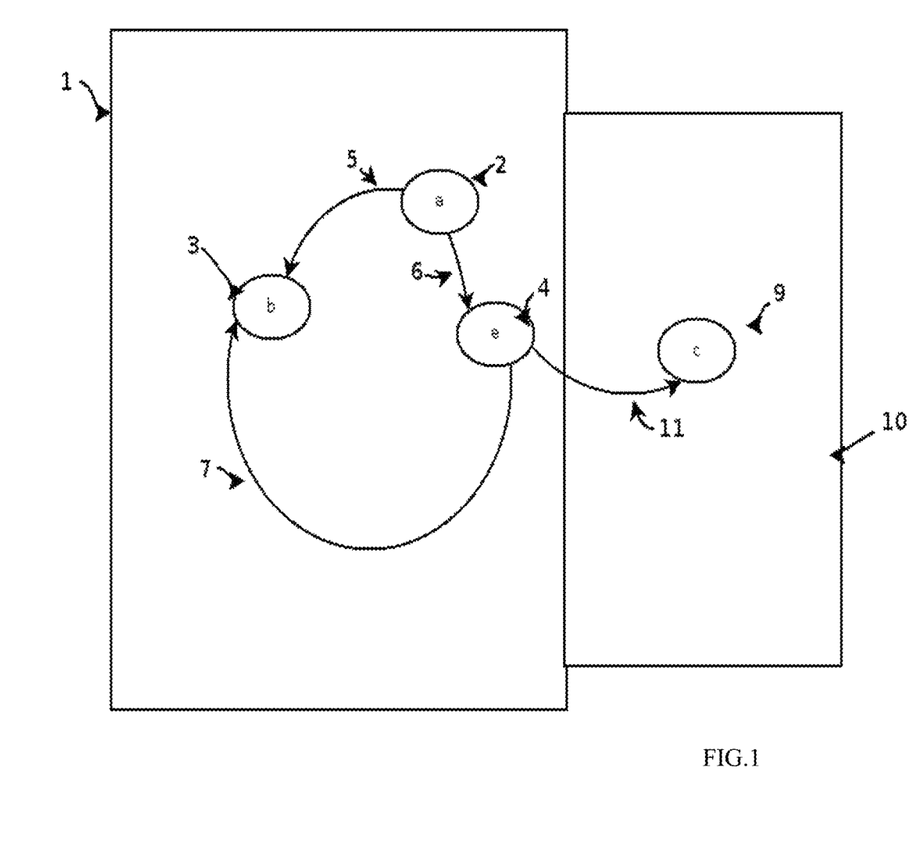
FIG. 1 shows a conceptual domain representation of a patent with its corresponding drawing.

FIG. 1 shows a conceptual domain representation of a patent with its corresponding drawing. The conceptual domain 1 contains a node 2 which is connected to a node 3 and a node 4 via a relationship 5 and a relationship 6 respectively. Node 3 is connected to node 4 via a relationship 7. The conceptual graph 1 represents known facts in a given domain with respect to a novel concept plane 10. The novel concept plane has a novel node 9 connected via a previously unknown relationship 11 that connects the conceptual domain 1 to the novel concept plane 10. This relationship can also be visualized via a drawing 12 which is a pictorial representation of one or more of the elements of the conceptual domain 1 and the novel concept plane 10. The picture element 13 may represent node 2 while picture element 14 may represent node 3 and picture element 15 may represent novel node 9.

Figure 2:
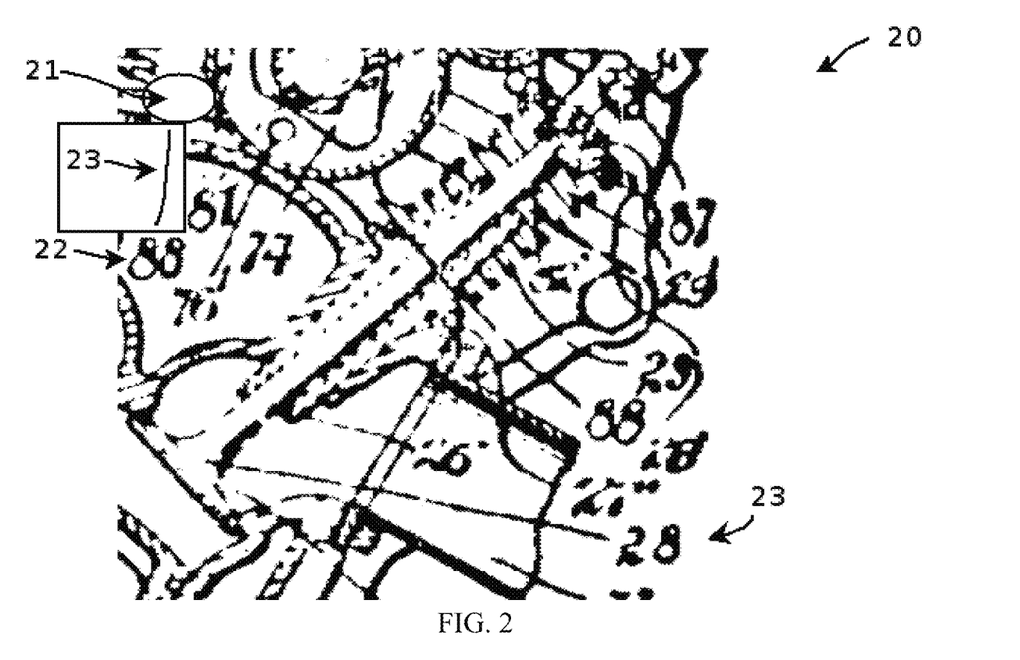
FIG. 2 shows an actual representation of a tagged image that is connected to a narrative that can be mapped to a conceptual domain.

FIG. 2 shows an actual representation of a tagged image that is connected to a narrative that can be mapped to a conceptual domain. FIG. 2 shows a tagged image 20 which in this particular case is a tagged patent image. The tagged image 20 has a referenced element 21 which is identified by a number 22. The number 22 is connected to the referenced element 21 by a line 23. Line 23 serves to narrow down the area of referenced element 21 within the totality represented by tagged image 20.

Figure 3:
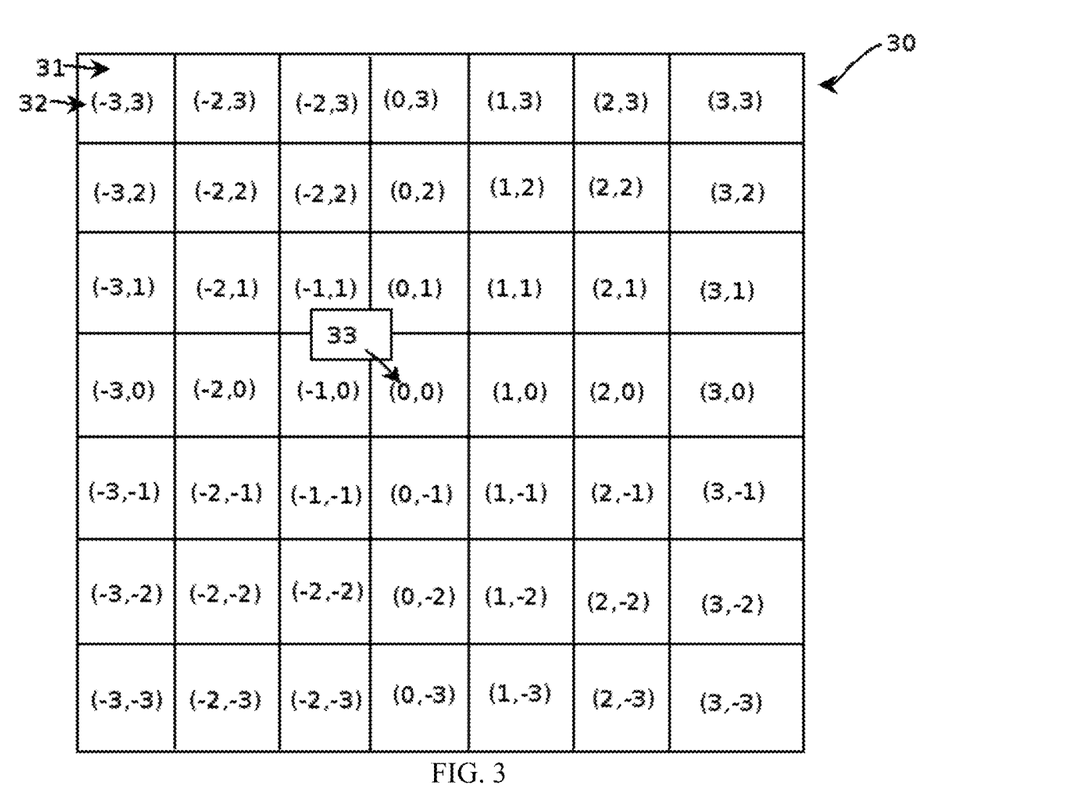
FIG. 3 shows a coordinate grid that has its origin at the center of said grid.

FIG. 3 shows a coordinate grid that has its origin at the center of said grid. The FIG. 3 shows a grid 30 that is projected on a tagged image 20. The grid 30 is divided into region 31 and each region has a set of unique coordinates 32.

The coordinates 32 are assigned from the center location 33 and extends outward in a spiral pattern. The center location is placed on the center of tagged image 20.

Figure 4:
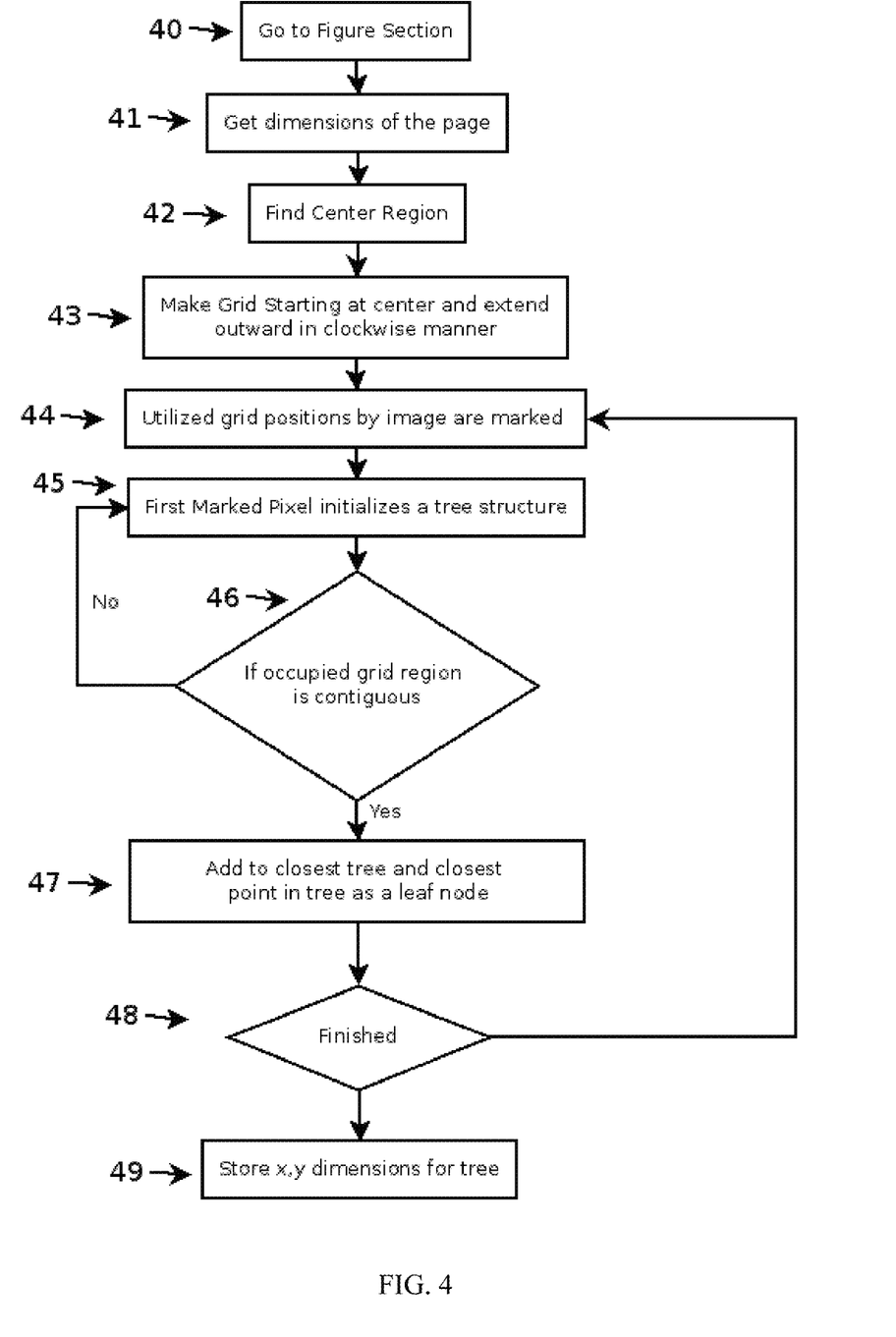
FIG. 4 shows a process of using the grid of FIG. 3 to convert image lines into a tree centered at the origin of the image.

FIG. 4 shows a process of using the grid of FIG. 3 to convert image lines into a tree centered at the origin of the image. The process starts with a step 40 of finding the appropriate section of a document or database that contains the tagged image 20. This can be by scanning a document with regular expressions, doing a database query, etc. From step 40 the process goes to a step 41 that gets the dimensions of the page or image borders that contain tagged image 20. After step 41 a step 42 finds the center of the tagged image 20. The tagged center of step 41 is then used to make the projection into grid 30 at step 43. The step 43 will the make the projection extending outward from the center in a clockwise manner. The grid constructed in step 43 will then be used to identify the positions of lines, points, curves and other graphical representations of tagged image 20 in step 44 using the clockwise pattern of step 43 to do a point search. The first point of a line or curve or other graphical representation identified by step 44 that is the first element of said graphical representation is then identified as the root node of a tree in step 45. After the root node is found, a step 46 determines if a point of a line or curve or other graphical representation is close to an existing tree structure leaf node that was initialized in step 45. If the point is not close to an existing leaf node, the decision in step 46 is negative and returns to step 45 to initialize a new tree structure. The closeness can be measured by a standard three by three matrix or other suitable size matrix arrangement. If the point is close to an existing leaf node, the decision in step 46 is positive and continues to step 47 that adds that point as a new leaf node to the existing tree structure. The step 47 will then proceed to a decision 48 that determines if all the coordinates within the tagged image 20 have been covered. If the decision is negative the decision 48 returns to step 44 where the process will continue the spiral pattern. If the decision of step 48 is positive, the tagged image 20 has been completely analyzed and will then proceed to step 49 where the information contained in the created trees will be stored for further analysis.

Figure 5:
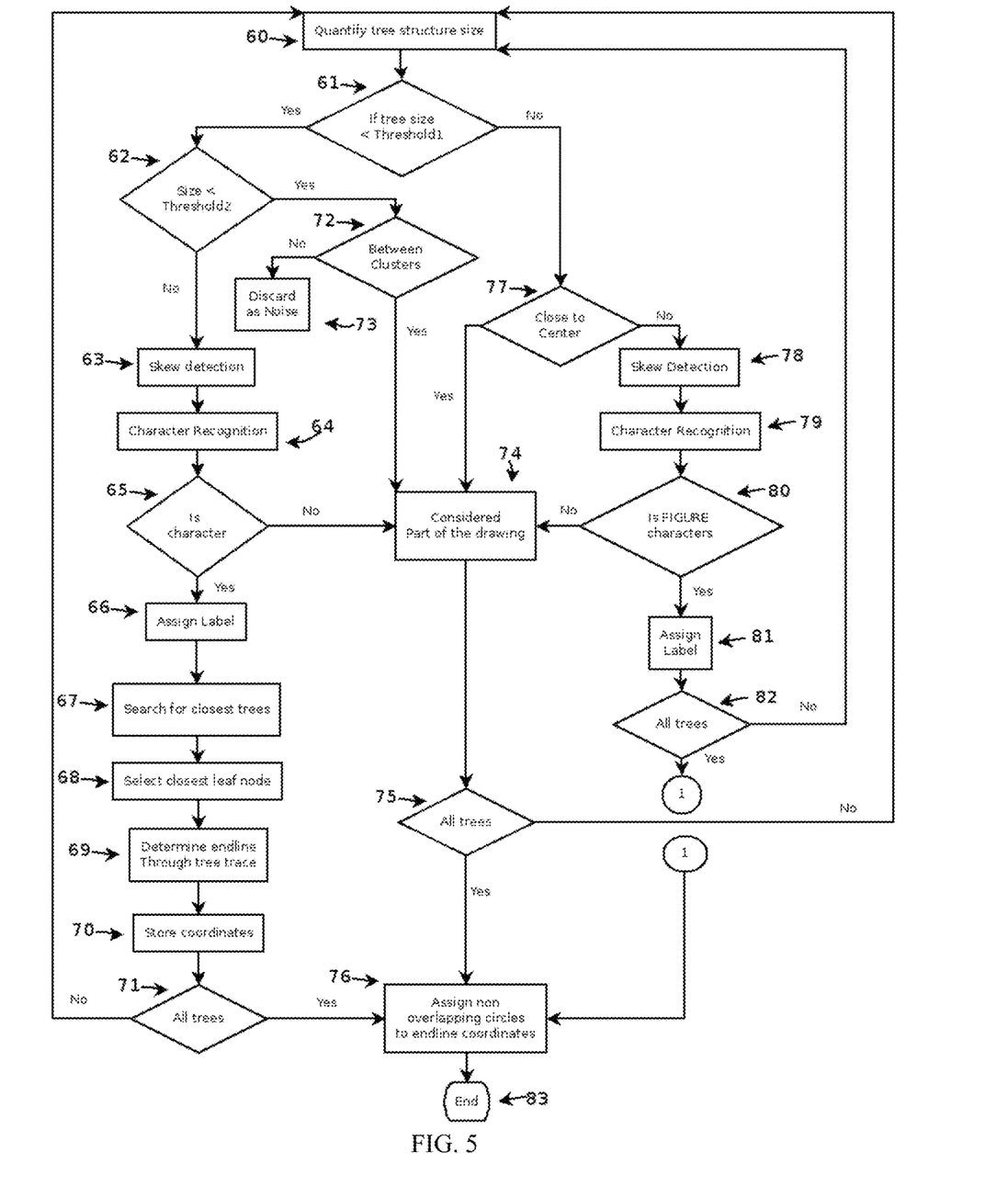
FIG. 5 shows the process of analyzing the tree structure and determining tagged element references.

FIG. 5 shows the process of analyzing the tree structure and determining tagged element references. The process starts by a step 60 that determines the tree structures of step 49. The step 60 quantifies the tree's size in terms of the x and y dimensions of the leaves with regards to the offsets from the center of the image represented by the root of the tree. The step 60 is followed by a decision step 61 that determines if the tree size is less than a first threshold. The first threshold of decision step 61 is aimed at determining an upper bound to number labels within the image boundaries. The decision step 61 is followed by a decision step 62 that establishes as second threshold. If the second threshold is not met then a step 63 establishes that the tree can represent a character due to its size of thresholds. The failure to meet the decision step 62 is followed by a step 63 that determines skewness of the top and bottom levels of the image and does the correction if necessary. The result of step 63 is passed to a character recognition step 64 that tries to match the tree to a trained machine learning algorithm, template database or other relevant character matching process. The results of character recognition step 64 are passed to a decision step 65 that determines if the match meets the threshold criteria for a match. If the decision step 65 is successful, a step 66 assigns a label to the character based on the character that was matched. Once a character has been assigned a label through step 66 the step 67 will search for a tree that is the closest to the tagged tree. The step 67 in combination with step 68 will lead to the selection of the closest leaf with respect to the tagged tree of step 66. The step 68 will also look at the shape of the leaf node and its neighbors to determine if it is a curve or end arrow with the intent of identifying if it is a descriptive curve that unites a region with its descriptive number. This, for example, would represent a patent reference number of the figure under analysis. Once the step 68 determines that the leaf belongs to a curve or end arrow it will proceed to step 69 that will trace the leaf node to either an intersection or endpoint that marks the endpoint of the curve or arrow pointing to the region of interest. The results of step 69 will be saved through a step 70. Once the data is saved in step 70 a decision step 71 will decide if the process of analysis of all trees is finished. If the decision step 71 is negative the process will go back to step 60. Decision step 62 also has a branching process if the decision is positive that leads to a decision step 72. The decision step 72 determines if the tree is located within a perimeter of trees that would put the location of the current tree under analysis within an image boundary. If the decision step 72 is negative it means the small tree is outside the perimeter of the image and then a step 73 that discards the tree based on the assumption that it is noise on the periphery of the image. If decision step 65 is negative or the decision step 72 is positive the step 74 classifies the tree as part of the image or drawing under analysis. From step 74 a decision step 75 will decide if the process of analysis of all trees is finished. If the decision step 75 is negative the process will go back to step 60. If step 75 is positive and step 71 is also positive then a step 76 will assign a circle that will enclose a non-overlapping region. This non-overlapping region refers to a region that is not contained within another circle assigned by this same iterative step. Both step 71 and step 76 must be true before step 76 takes place. Decision step 61 can have a negative evaluation outcome that leads to a decision step 77 that analyzes the distance of the tree from the center. If the answer is positive then the decision step 77 proceeds to step 74. If the decision step 77 is negative, then the tree is based on the periphery of the image and goes to a step 78 that does skewness detection. The step 78 will then pass the information to a step 79 that tries to match the tree to a trained machine learning algorithm, template database or other relevant character matching process. The result of step 79 will then be processed by a decision step 80 that will determine if the match meets the threshold criteria for a match. If it is negative the decision step will proceed to step 74. If the decision step is positive then it assigns a label in step 81. As an example of this last step, the recognition output should be that of the recognition of the "figure X" label. After successful label assignment in step 81 the process will continue with a decision step 82 that will decide if the process of analysis of all trees is finished. If decision step 82 is negative then it will return to step 60. If the decision step 82 is positive it will continue to step 76 and finally end the routine in step 83.

Figure 6:
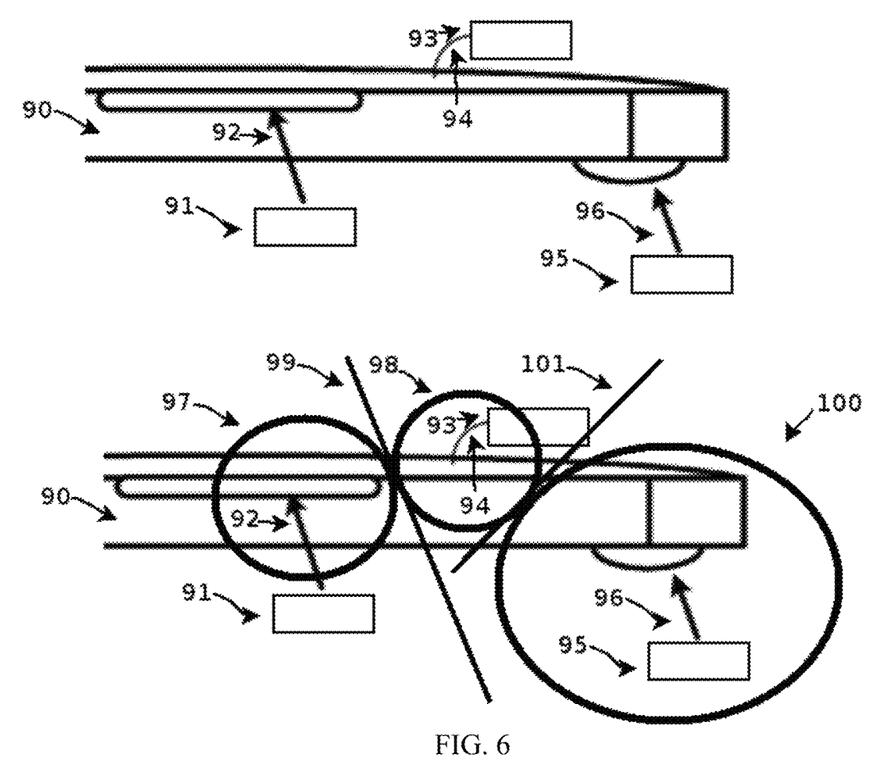
FIG. 6 shows the output of the process shown in FIG. 5.

FIG. 6 shows the output of the process shown in FIG. 5 in which there is a labeled device diagram 90. The diagram 90 contains a reference 91 which may be an alphanumeric ID. The reference 91 is linked to an element of diagram 90 via an arrow 92. A second reference 93 is linked to an element of diagram 90 via an arrow 94. Finally, a third reference 95 is linked to an element of diagram 90 via an arrow 96. A second representation of diagram 90 shows the result of the process consisting of steps 60 to 84. The diagram 90 now has a circle 97 and circle 98. Circle 97 and 98 join at a point within a tangential line 99. Circle 98 also has a neighbor circle 100 that touches circle 98 at a point within a tangential line 101. Circles 97, circle 98 and circle 100 will be adjusted in size as the process consisting of steps 60 to 84 finds matches of the same elements within other documents that will refine the circumference of the circle.

Figure 7:
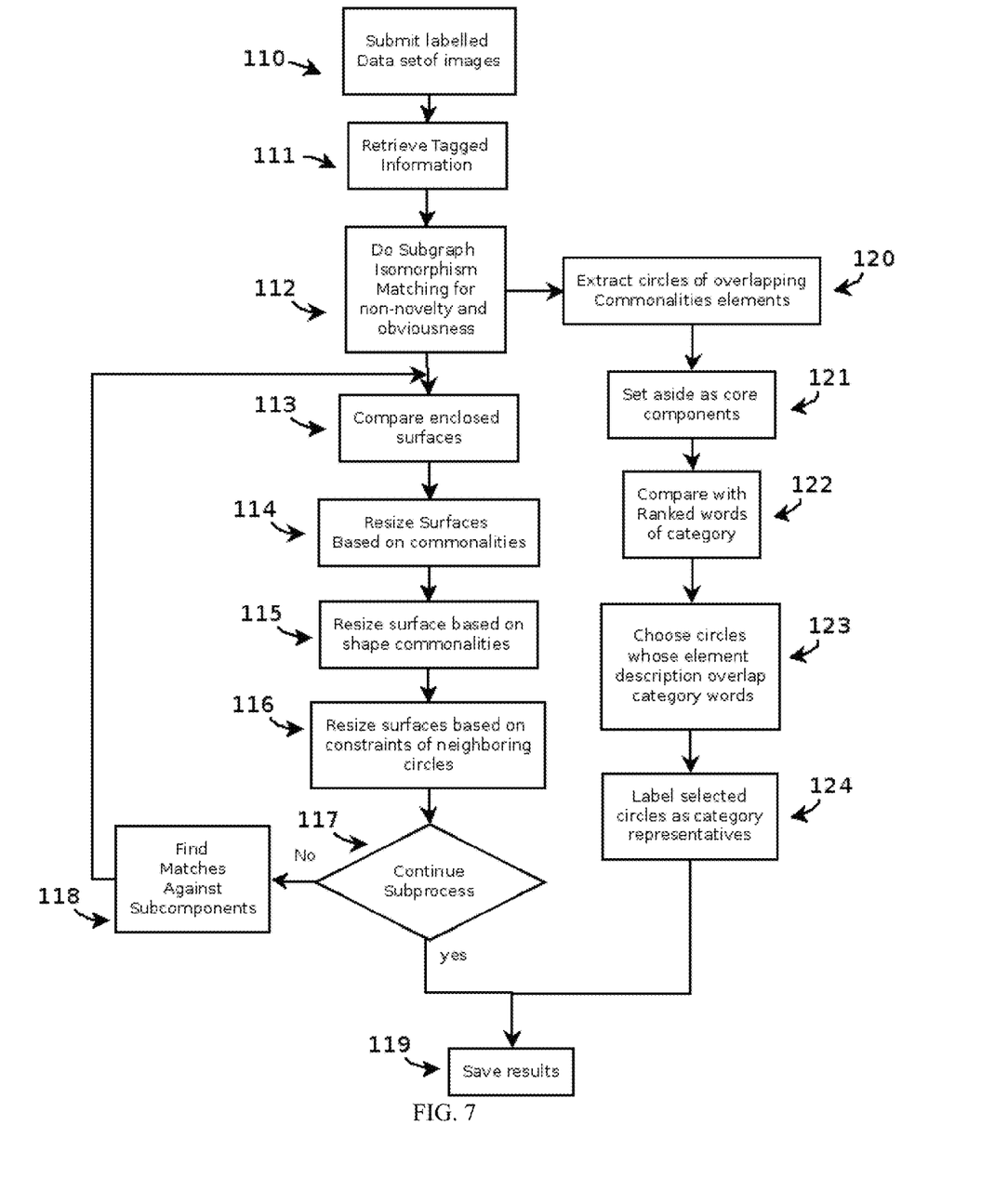
FIG. 7 shows the overall process of processing the image to obtain the correct circumference of the referenced sub-image and the classification of the images into categories

FIG. 7 shows the overall process of processing the image to obtain the correct circumference of the referenced sub-image and the classification of the images into categories. The process starts with the submission of the dataset of images to the system in step 110. The received submission of step 110 is processed by step 111 that retrieves the tagged information from steps 60 to 84. The tagged information of step 112 is referenced in the body of the document that was processed in step 112 by doing a graph isomorphism. The graph isomorphism of step 112 generates sub graphs of non-novel elements and obvious components of the narrative that will be matched to the tagged information of step 111. These matched subgraph elements of step 112 are then used in step 113 to reference the drawing elements enclosed by the circles of process consisting of steps 60 to 84 and compare the enclosed surfaces. The use of multiple documents in step 113 will yield several circumferences of the same referenced element and they will be re-sized on circle and narrative commonalities in step 114. The re-sizing of the circumference based on commonalities will be made proportional to the radius in proportion to the overall drawing size. The re-sizing of the circle based on narrative commonalities will include measurements included in the narrative, relative positioning, etc. The step 114 will follow by a re-sizing based on elements inside the circle that are in common with common elements in circles of other referenced images in step 115. After step 115 a step 116 will re-size the circles based on constraints imposed by the neighboring circles in other images of the same document or other documents. The step 116 will continue to a decision step 117 where a decision to continue to sub-components is made. If the decision step 117 is positive, a step 118 will search the graph for references of the circle elements in the narrative to find out if there are further references to sub-components. The sub-components can be for example, a reference to an exploded view among other types of references that will allow refinement of the comparison to other images. The step 118 then loops into step 113 to continue the process. If the decision step 117 is negative then the results are saved in step 119. A second process takes place in step 112 that branches into step 120 that extracts circles of overlapping commonalities from the images based on the references in the graph. The step 120 follows by a step 121 that these circles are then set aside as core components of a selected category. The step 121 then proceeds to step 122 which compares them to a ranked profile of words of the category under study. The step 122 proceeds with a step 123 where the circles are selected based on direct references to the highest ranking word profiles. A step 124 labels the circles selected in step 123 as the representatives of the category. The obtained results of step 124 are saved via step 119.

Figure 8:
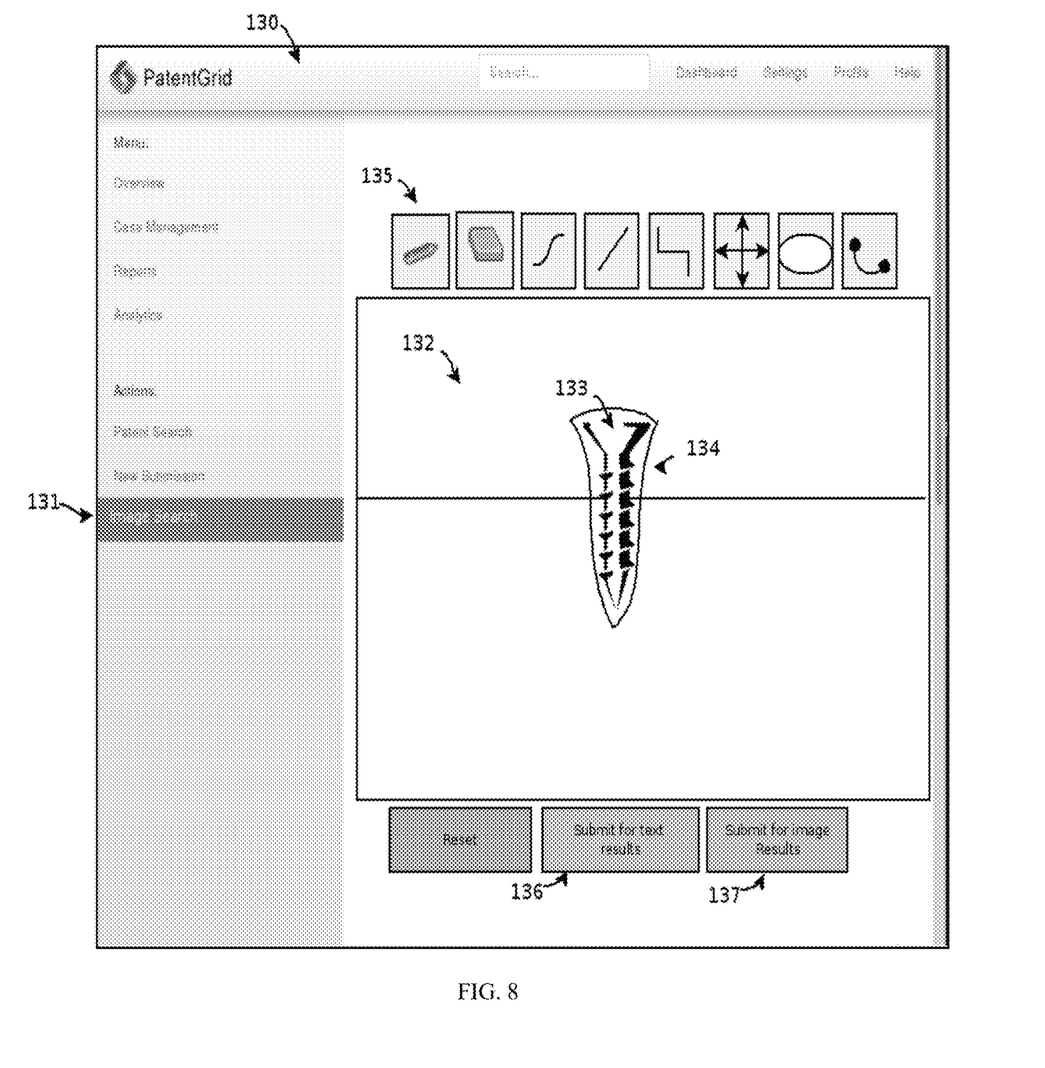
FIG. 8 shows a graphical interface on which to query the proposed system.

FIG. 8 shows a graphical interface on which to query the proposed system. A query interface 130 displays a preferred simple interface embodiment of the proposed system. Interface 130 has a section 131 that is the particular image search section of the system. The user can then upload an image 132 that contains a region of interest 133. The region of interest 133 can be selected by an outline 134 through a selection of tools 135. The outline 134 serves to extract the region of interest 133 and submit it via a button 136 for text results or button 137 for image results.

Figure 9:
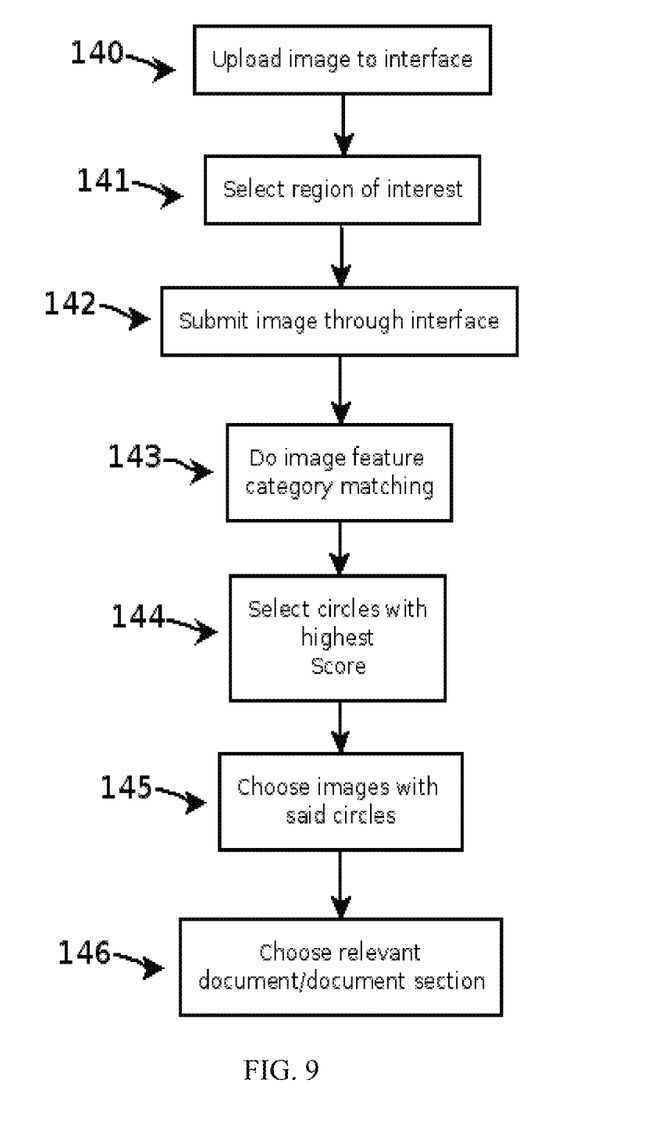
FIG. 9 shows the process of region of interest processing submitted via the proposed interface.

FIG. 9 shows the process of region of interest processing submitted via the proposed interface. The step 140 is the actual loading of the information to query interface 130. Through interface 130 the step 141 of selecting the region of interest 133 is carried out. The interface 130 also provides the means to execute step 142 that allows the user to submit the region of interest 133 for textual or image information retrieval. The region of interest 133 submitted in step 142 is then compared against circles that are category representatives obtained in step 123 of FIG. 7. The step 143 will proceed with the selection of the highest scoring match through a step 144. The step 144 will proceed to step 145 that chooses the images with said circles. Finally an optional step 146 follows from step 145 that selects the relevant document passage or document in case the user selected button 136.

Figure 10:
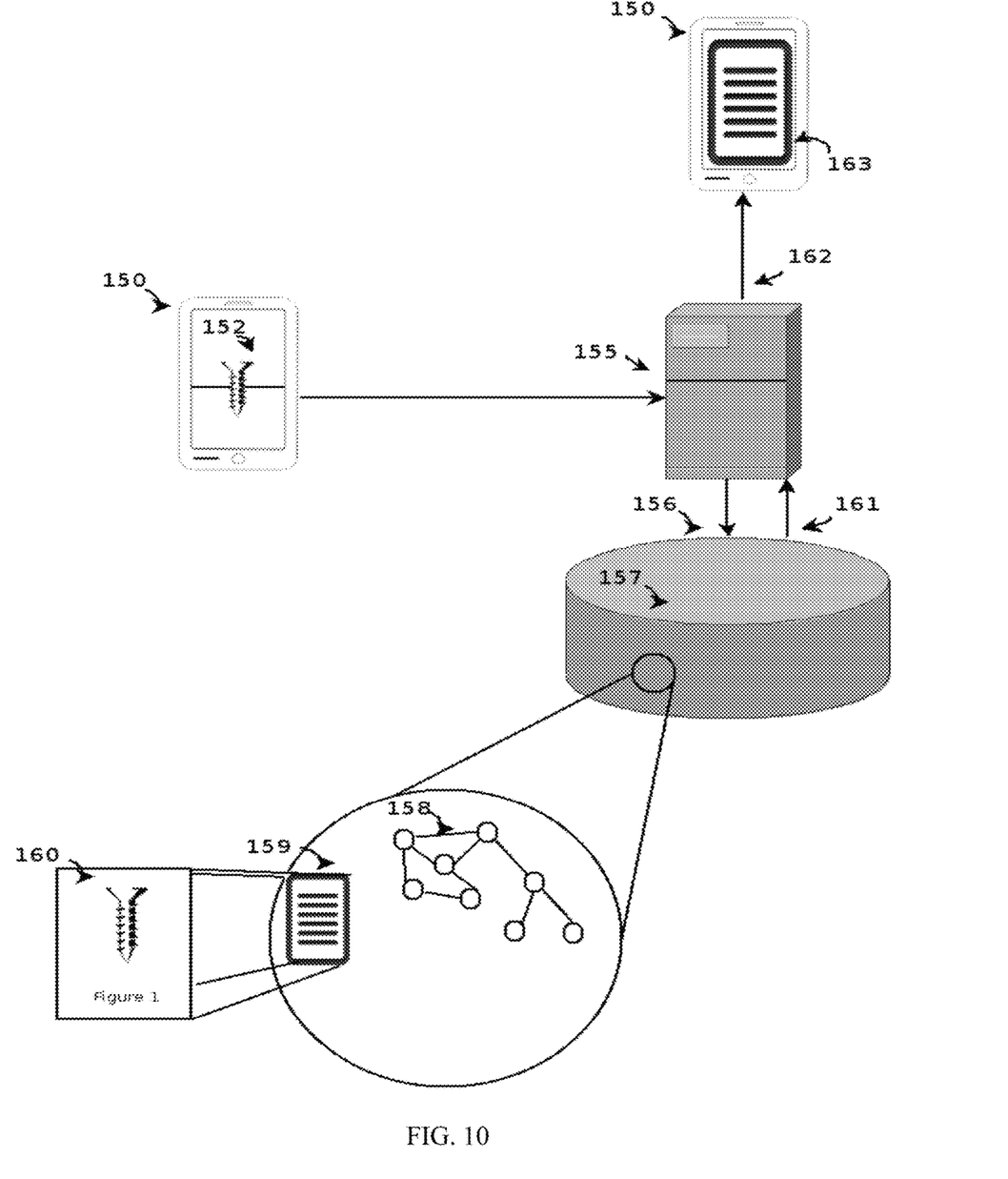
FIG. 10 displays the proposed systems that carries out the proposed invention.

FIG. 10 displays the proposed systems that carries out the proposed invention. The system consists of an end user terminal 150 which displays query interface 130 information on display 152. The request made through interface 130 reaches a computer system 155 that processes the information. A query 156 originates from computer system 155 to a database 157 that holds the stored information. The information stored in database 157 consists but is not limited to the graphs 158 of document 159 and representative circles of images 160. Additional information such as indexes of categories word score profiles of the classes and documents are also stored in database 157. The database 157 retrieves the relevant results based on the processes disclosed and returns them via a result message 161. The computer system 155 receives the result message 161 and returns it to the end user terminal 150 through a message 162. The end user terminal 150 then displays the results via a result interface 163.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures. All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. A method for establishing a relationship between a conceptual domain and an image comprising the steps of:
   projecting said image into a coordinate grid;

scanning said image in a spiral fashion from a center of said image outward in a clockwise manner;

identifying a plurality of positions for a plurality of elements in said image based on said coordinate grid;

creating a plurality of tree structures based on said plurality of positions for a plurality of elements;

relating, based on said tree structure, a plurality of regions of interest from said image to a plurality of references present in said conceptual domain, wherein each one of said plurality of tree structures comprises a root node and at least one leaf node, wherein said root node of each of said plurality of tree structures is a first point of one of said plurality of elements, and wherein each of said at least one leaf node of each of said plurality of tree structures is a point closer to said root node than to another leaf node;

scanning said plurality of tree structures from a plurality of leaf nodes to a root node to find a plurality of indications of bifurcation that signal an end of a representative line that joins said references with said regions of interest, wherein one end of said representative line points to one of said references and the other end of said representative line points to the region of interest that is joined to said reference in one of said plurality of tree structures;

normalizing said regions of interest based on (i) textual references that include narrative commonalities with the conceptual domain, and (ii) related document images that include elements with narrative commonalities to the conceptual domain; and determining a relevance of said regions of interest and assigning said relevance as a representative of a category by matching a plurality of representative word score histograms to said regions of interest.

2. The method of claim 1, further comprising analyzing a plurality of dimensions of said image to discriminate continuous regions that describe a figure in said image, in a spiral fashion with origin at said center of said image.

3. The method of claim 1, further comprising scanning in spiral fashion outward in a clockwise manner to detect contiguously connected regions through a proximity matrix.

4. The method of claim 1, further comprising consolidating a plurality of contiguous regions of said plurality of positions and adding them to one of said plurality of tree structures.

5. The method of claim 1, further comprising normalizing said regions of interest based on descriptive curves and lines within said region of interest.

6. A system for establishing a relationship between a conceptual domain and an image comprising:

one or more computer processors;

one or more computer readable storage devices;

program instructions stored on said one or more computer readable storage devices for execution by at least one of said one or more computer processors, said stored program instructions comprising:

program instructions for projecting said image into a coordinate grid;

program instructions for scanning said image in a spiral fashion from a center of said image outward in a clockwise manner;

program instructions for identifying a plurality of positions for a plurality of elements in said image based on said coordinate grid;

program instructions for creating a tree structure based on said plurality of positions for a plurality of elements;

program instructions for relating, based on said tree structure, a plurality of regions of interest from said image to a plurality of references present in said conceptual domain, wherein each one of said plurality of tree structures comprises a root node and at least one leaf node, wherein said root node of each of said plurality of tree structures is a first point of one of said plurality of elements, and wherein each of said at least one leaf node of each of said plurality of tree structures is a point closer to said root node than to another leaf node;

program instructions for scanning said plurality of tree structures from a plurality of leaf nodes to a root node to find a plurality of indications of bifurcation that signal an end of a representative line that loins said references with said regions of interest, wherein one end of said representative line points to one of said references and the other end of said representative line points to the region of interest that is joined to said reference in one of said plurality of tree structures;

program instructions for normalizing said regions of interest based on (i) textual references that include narrative commonalities with the conceptual domain, and (ii) related document images that include elements with narrative commonalities to the conceptual domain; and program instructions for determining a relevance of said regions of interest and assigning said relevance as a representative of a category by matching a plurality of representative word score histograms to said regions of interest.

7. The system of claim 6, further comprising program instructions for analyzing a plurality of dimensions of said image to discriminate continuous regions that describe a figure in said image, in a spiral fashion with origin at said center of said image.

8. The system of claim 6, further comprising program instructions for scanning in spiral fashion to detect contiguously connected regions through a proximity matrix.

9. The system of claim 6, further comprising program instructions for consolidating a plurality of contiguous regions of said plurality of positions and adding them to one of said plurality of tree structures.

10. The system of claim 6, further comprising program instructions for normalizing said regions of interest based on descriptive curves and lines within said region of interest.

* * * * *